(12) United States Patent
Asakawa et al.

(10) Patent No.: US 12,270,434 B2
(45) Date of Patent: Apr. 8, 2025

(54) BEARING, STRAIN WAVE GEAR DEVICE, AND INDUSTRIAL ROBOT

(71) Applicant: Nabtesco Corporation, Tokyo (JP)

(72) Inventors: Yuichi Asakawa, Tokyo (JP); Takafumi Ito, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 18/471,592

(22) Filed: Sep. 21, 2023

(65) Prior Publication Data
US 2024/0102511 A1   Mar. 28, 2024

(30) Foreign Application Priority Data
Sep. 28, 2022 (JP) ................................. 2022-154763

(51) Int. Cl.
*F16H 49/00* (2006.01)
*F16C 19/36* (2006.01)
*F16C 19/49* (2006.01)

(52) U.S. Cl.
CPC ............ *F16C 19/362* (2013.01); *F16C 19/49* (2013.01); *F16H 49/001* (2013.01); *F16C 2322/59* (2013.01)

(58) Field of Classification Search
CPC ........ F16C 19/362; F16C 19/49; F16C 43/06; F16C 2322/59; B25J 9/102; F16H 49/001
See application file for complete search history.

(56) References Cited

U.S. PATENT DOCUMENTS

| 5,218,764 A | * | 6/1993 | Suzuki | F16C 43/06 29/559 |
| 8,616,086 B2 | * | 12/2013 | Hirai | B25J 9/1025 74/640 |

(Continued)

FOREIGN PATENT DOCUMENTS

| CN | 102434635 A | 5/2012 |
| JP | 2011-106544 A | 6/2011 |
| JP | 2011-163462 A | 8/2011 |

OTHER PUBLICATIONS

Extended European Search Report dated Jan. 24, 2024, issued in corresponding European Patent Application No. 23198782.7 (13 pgs.).

*Primary Examiner* — Thomas C Diaz
(74) *Attorney, Agent, or Firm* — Pillsbury Winthrop Shaw Pittman LLP (57) ABSTRACT

One aspect of the present disclosure provides a first bearing including an inner ring, an outer ring, and cylindrical rollers. The inner ring includes: an insertion groove formed in a lower surface for inserting the cylindrical rollers between an inner raceway surface and an outer raceway surface; a blocking plug configured to block the insertion groove, the blocking plug having a part of the inner raceway surface formed thereon; and a bolt for securing the blocking plug in the insertion groove. In the mating surface of the blocking plug contacted with the bottom surface of the insertion groove, when the shortest length between the bolt insertion hole and the inner raceway surface is shown as La, and the shortest length between the bolt insertion hole and the inner peripheral surface is shown as Lb, the shortest lengths La and Lb satisfy the following formula: La/Lb>0.65.

4 Claims, 5 Drawing Sheets

(56) References Cited

U.S. PATENT DOCUMENTS

| | | | |
|---|---|---|---|
| 8,875,598 B2* | 11/2014 | Horiuchi | F16C 19/55 74/640 |
| 2002/0017160 A1* | 2/2002 | Kiyosawa | F16H 57/021 74/640 |
| 2019/0003525 A1* | 1/2019 | Murayama | F16C 19/36 |
| 2022/0049762 A1 | 2/2022 | Kataoka | |

* cited by examiner

BEARING, STRAIN WAVE GEAR DEVICE, AND INDUSTRIAL ROBOT

CROSS-REFERENCE TO RELATED APPLICATIONS

This application is based on and claims the benefit of priority from Japanese Patent Application Serial No. 2022-154763 (filed on Sep. 28, 2022), the contents of which are hereby incorporated by reference in their entirety.

TECHNICAL FIELD

The present disclosure relates to a bearing, a strain wave gear device, and an industrial robot.

BACKGROUND

A bearing includes an inner ring with an inner raceway surface formed on its outer peripheral surface, an outer ring with an outer raceway surface formed on its inner peripheral surface, and a plurality of rolling elements positioned between the inner raceway surface and the outer raceway surface. One such bearing is called a cross roller bearing. The inner and outer raceway surfaces of a cross roller bearing are shaped like a V-groove, and the inner and outer raceway surfaces form a rectangular raceway as viewed from the circumferential direction. The rolling elements of a cross roller bearing are so-called cylindrical rollers. The cylindrical rollers are arranged so that their inclination angles alternate in the circumferential direction.

The inner ring of such a cross roller bearing has an insertion groove (roller insertion groove) that runs from its side surface in the axial direction to the inner raceway surface. In assembly of a cross roller bearing, a plurality of rolling elements are inserted between the inner and outer raceway surfaces through the insertion groove. The insertion groove is blocked with a blocking plug (plug). The blocking plug is fixed to the insertion groove (inner ring) with a bolt (e.g., Japanese Patent Application Publication No. 2011-163462).

When a cross roller bearing as described above is used in a device, a load is repeatedly applied to the blocking plug through the rolling elements during the operation of the device. This load could cause rattling of the blocking plug and cause looseness of the bolt securing the blocking plug. This could cause instable rolling of the rolling elements, making it difficult for the bearing to continue stable operation.

SUMMARY

The present disclosure provides a bearing, a strain wave gear device, and an industrial robot capable of continuing reliable and stable operation.

A bearing according to one aspect of the disclosure comprises: an inner ring having an inner raceway surface formed in an outer peripheral surface thereof; an outer ring having an outer raceway surface formed in an inner peripheral surface thereof; a plurality of rolling elements placed between the inner raceway surface and the outer raceway surface; an insertion groove formed in an axially-facing side surface of the inner ring or the outer ring for inserting the plurality of rolling elements between the inner raceway surface and the outer raceway surface; a blocking plug configured to block the insertion groove, the blocking plug having a part of the inner raceway surface or the outer raceway surface formed thereon; and a bolt for securing the blocking plug in the insertion groove, wherein the blocking plug includes: a plug body having a bolt insertion hole formed therethrough in an axial direction, the bolt insertion hole being configured to receive the bolt; and a mating surface formed on the plug body and configured to overlap a bottom surface of the insertion groove, and wherein in the mating surface, when a shortest length between the bolt insertion hole and the inner raceway surface or the outer raceway surface is shown as La, and a shortest length between the bolt insertion hole and a peripheral surface radially opposite to the inner raceway surface or the outer raceway surface is shown as Lb, the shortest lengths La and Lb satisfy a following formula: $La/Lb>0.65$.

With this configuration, the mating surface of the blocking plug can be contacted as tightly as possible with the bottom surface of the insertion groove. This minimizes the rattling of the blocking plug in using the bearing and also minimizes the loosening of the bolt. In this manner, the bearing can continue stable operation.

In the above configuration, it is also possible that when a head of the bolt is projected onto the mating surface in the axial direction, the head of the bolt is within the mating surface.

In the above configuration, it is also possible that the insertion groove includes a plurality of flat inner side surfaces, the blocking plug includes a plurality of flat outer side surfaces that overlap the plurality of inner side surfaces, and the plurality of inner side surfaces include the bottom surface, and the plurality of outer side surfaces include the mating surface.

In the above configuration, it is also possible that the inner raceway surface and the outer raceway surface have a V-groove shape, and the plurality of rolling elements include cylindrical rollers and are arranged so that inclination angles thereof alternate in a circumferential direction.

A strain wave gear device according to another aspect of the disclosure comprises: an internal gear; an external gear positioned radially inside the internal gear; a wave generator being in contact with an inner peripheral surface of the external gear; an extended portion extending from the external gear; and a bearing rotatably supporting the extended portion relative to the internal gear, wherein the external gear has elasticity and rotates relative to the internal gear about an axis of rotation while partially meshing with the internal gear, wherein the wave generator causes the meshing between the internal and external gears to move in a circumferential direction extending around the axis of rotation, wherein the bearing includes: an inner ring having an inner raceway surface formed in an outer peripheral surface thereof; an outer ring having an outer raceway surface formed in an inner peripheral surface thereof; a plurality of rolling elements placed between the inner raceway surface and the outer raceway surface; an insertion groove formed in an axially-facing side surface of the inner ring or the outer ring for inserting the plurality of rolling elements between the inner raceway surface and the outer raceway surface; a blocking plug configured to block the insertion groove, the blocking plug having a part of the inner raceway surface or the outer raceway surface formed thereon; and a bolt for securing the blocking plug in the insertion groove, wherein the blocking plug includes: a plug body having a bolt insertion hole formed therethrough in an axial direction, the bolt insertion hole being configured to receive the bolt; and a mating surface formed on the plug body and configured to overlap a bottom surface of the insertion groove, and wherein in the mating surface, when a shortest length between the bolt insertion hole and the inner raceway surface or the outer raceway surface is shown as La, and a shortest length between the bolt insertion hole and a peripheral surface radially opposite to the inner raceway surface or the outer raceway surface is shown as Lb, the shortest lengths La and Lb satisfy a following formula: La/Lb>0.65.

This configuration minimizes the rattling of the blocking plug of the bearing in using the strain wave gear device. Also, this configuration minimizes loosening of the bolt of the bearing. Thus, the strain wave gear device can continue stable operation.

An industrial robot according to another aspect of the disclosure comprises: a power generating unit for generating a rotational force; a strain wave gear device including an input part and an output part, the input part being configured to receive the rotational force of the power generating unit, the output part being configured to change a speed of rotation of the input part and output the rotation at the changed speed; and a mating member mounted on the output part of the strain wave gear device, wherein the strain wave gear device includes: an internal gear; an external gear positioned radially inside the internal gear; a wave generator positioned in contact with an inner peripheral surface of the external gear and configured to cause meshing between the internal and external gears to move in a circumferential direction extending around an axis of rotation; an extended portion extending from the external gear; and a bearing rotatably supporting the extended portion relative to the internal gear, wherein the external gear has elasticity and rotates relative to the internal gear about the axis of rotation while partially meshing with the internal gear, and the external gear serves as either the input part or the output part, wherein the bearing includes: an inner ring having an inner raceway surface formed in an outer peripheral surface thereof; an outer ring having an outer raceway surface formed in an inner peripheral surface thereof; a plurality of rolling elements placed between the inner raceway surface and the outer raceway surface; an insertion groove formed in an axially-facing side surface of the inner ring or the outer ring for inserting the plurality of rolling elements between the inner raceway surface and the outer raceway surface; a blocking plug configured to block the insertion groove, the blocking plug having a part of the inner raceway surface or the outer raceway surface formed thereon; and a bolt for securing the blocking plug in the insertion groove, wherein the blocking plug includes: a plug body having a bolt insertion hole formed therethrough in an axial direction, the bolt insertion hole being configured to receive the bolt; and a mating surface formed on the plug body and configured to overlap a bottom surface of the insertion groove, and wherein in the mating surface, when a shortest length between the bolt insertion hole and the inner raceway surface or the outer raceway surface is shown as La, and a shortest length between the bolt insertion hole and a peripheral surface radially opposite to the inner raceway surface or the outer raceway surface is shown as Lb, the shortest lengths La and Lb satisfy a following formula: La/Lb>0.65.

This configuration minimizes the rattling of the blocking plug of the bearing in driving the above industrial robot having the strain wave gear device. Also, this configuration minimizes loosening of the bolt of the bearing. Thus, the industrial robot can continue stable operation.

The bearing, the strain wave gear device, and the industrial robot described above are capable of continuing reliable and stable operation.

BRIEF DESCRIPTION OF THE DRAWINGS

FIGS. 5A and 5B are views for comparing the degrees of tightness in contact of the mating surface of the blocking plug with the bottom surface of the insertion groove in the embodiment of the present disclosure, wherein FIG. 5A shows the case where the predetermined condition is satisfied, and FIG. 5B shows the case where the predetermined condition is not satisfied.

DESCRIPTION OF THE EMBODIMENTS

The embodiments of the present disclosure will be hereinafter described with reference to the drawings.
<Industrial Robot>

Figure 1:
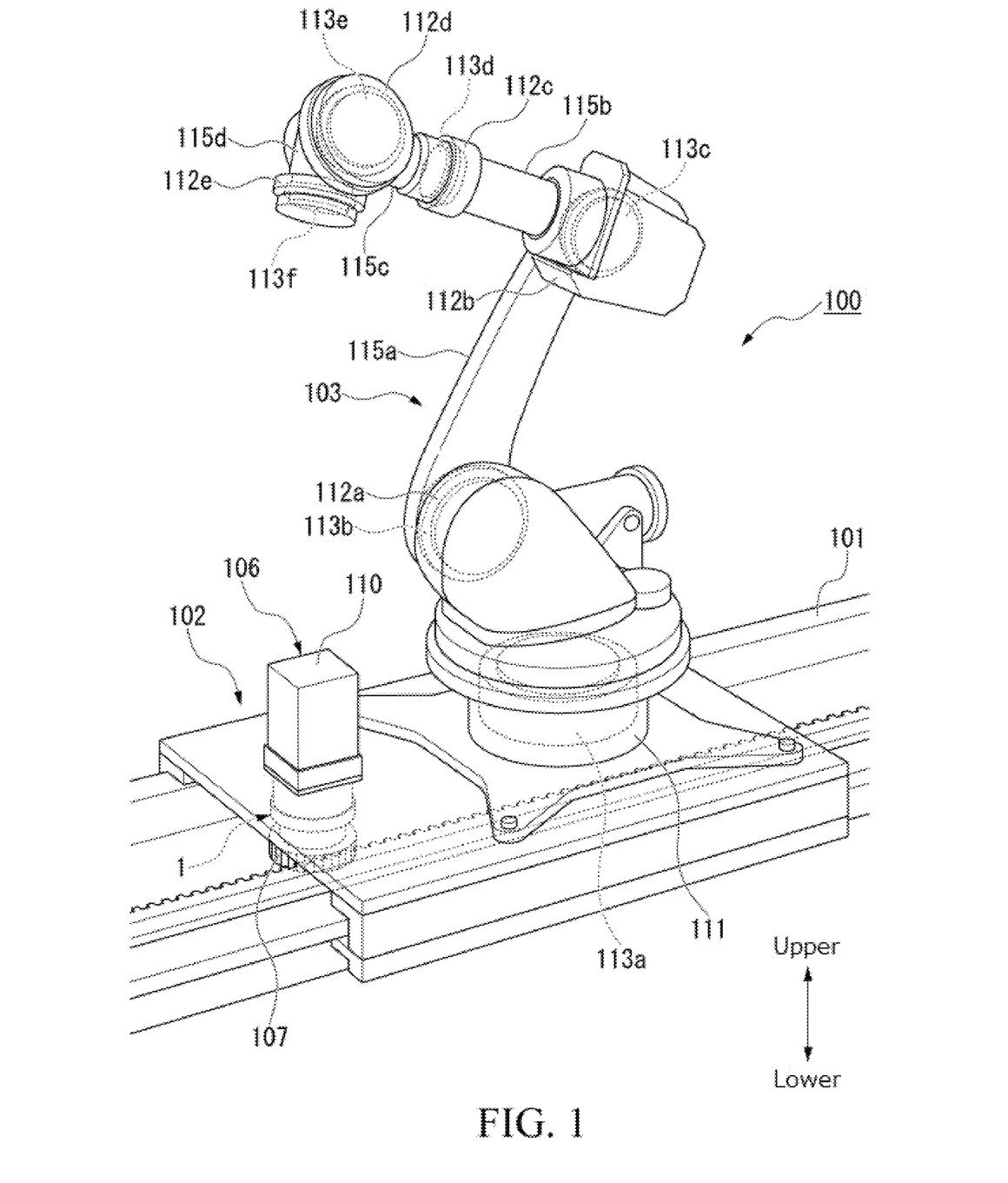
FIG. 1 schematically illustrates a configuration of an industrial robot relating to an embodiment of the present disclosure.

FIG. 1 is a schematic view showing the configuration of an industrial robot 100. As shown in FIG. 1, the industrial robot 100 has a traveling rail 101, a base unit 102 (an example of a mating member set forth in the claims) that is movable on the traveling rail 101, and a robot body 103 on the base unit 102. The base unit 102 and the arms (an example of the mating member set forth in the claims) 115a to 115d of the robot body 103 have joints 111, 112a to 112e that are respectively provided with reducer-equipped motors 106, 113a to 113f.

The reducer-equipped motors 106, 113a-113f are all configured in the same manner. Of the reducer-equipped motors 106, 113a-113f, the reducer-equipped motor 106 provided on the base unit 102 is taken as an example. The reducer-equipped motor 106 includes a strain wave gear device 1 and an electric motor 110 (an example of a power generating unit set forth in the claims) for applying power to the strain wave gear device 1.

In FIG. 1, the other reducer-equipped motors 113a-113f are only simply shown, and their strain wave gear devices and electric motors are not identified by reference numbers. In the following description, only the reducer-equipped motor 106 of the base unit 102 will be discussed. The other reducer-equipped motors 113a-113f are not described. In the industrial robot 100, the reducer-equipped motors 106, 113a to 113f are driven, so that the robot body 103 runs on the traveling rail 101 and the arms 115a-115d assume various postures.
<Strain Wave Gear Device>

Figure 2:
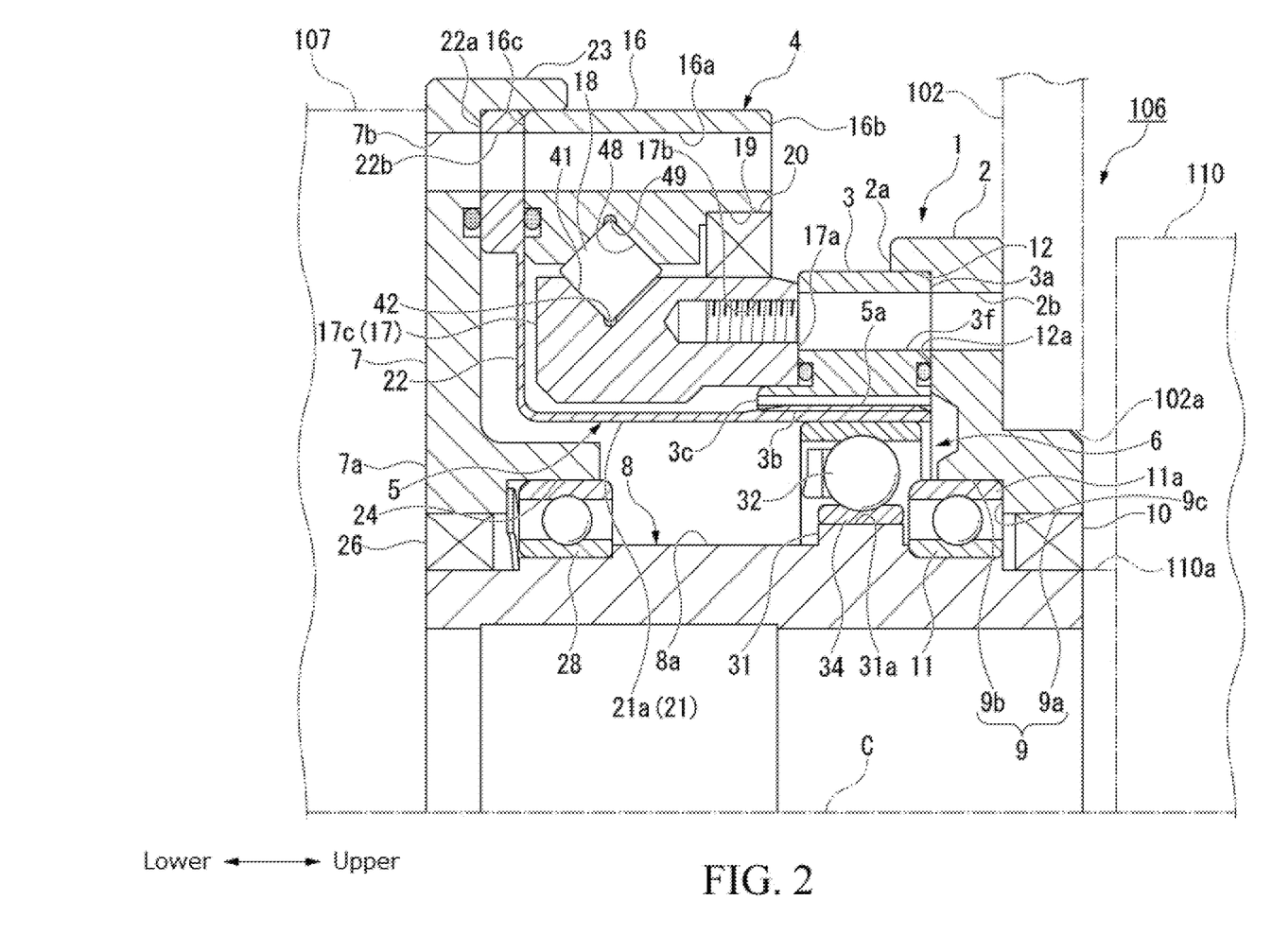
FIG. 2 is a sectional view showing a strain wave gear device relating to an embodiment of the present disclosure along an axis of rotation.

The following now describes the strain wave gear device 1 with reference to FIG. 2. FIG. 2 is a sectional view showing the strain wave gear device 1 along an axis of rotation C. In FIG. 2, the axis of rotation C is positioned at the center, and the lower half is not shown. In the following description, the terms "axial direction," "circumferential direction" and "radial direction" respectively refer to the direction along the axis of rotation C, the direction extending around the axis of rotation C, and the radial direction of the strain wave gear device 1 orthogonal to the axial and circumferential directions. In the following description, the upward and downward directions are defined with the reducer-equipped motor 106 being fixedly attached on the top of the base unit 102.

As shown in FIG. 2, the strain wave gear device 1 includes a housing 2, an internal gear 3 and a first bearing 4 (an example of a bearing set forth in the claims) fixedly attached to the housing 2, an external gear 5 radially inside the internal gear 3, a wave generator 6 radially inside the external gear 5, an output plate 7 (an example of an output part set forth in the claims) fixedly attached to the external gear 5 together with the first bearing 4, and a reducer shaft 8 coupled to a motor shaft 110a of an electric motor 110. The reducer shaft 8 is configured to impart a rotational force to the wave generator 6. The motor shaft 110a of the electric motor 110 is coupled to the upper end (the right end in FIG. 2) of the reducer shaft 8. The output plate 7 is located at the lower end (the left end in FIG. 2) of the reducer shaft 8.

<Housing>

The housing 2 is fixedly attached to the base unit 102 using bolt, which are not shown. The housing 2 has a stepped through hole 9 formed therein. The stepped through hole 9 is penetrated by the reducer shaft 8. The stepped through hole 9 is divided into a small-diameter hole 9a positioned on the upper side (facing the electric motor 110) and a large-diameter hole 9b positioned on the lower side of the small-diameter hole 9a (facing away from the electric motor 110). The large-diameter hole 9b is contiguous to the small-diameter hole 9a via a step 9c. The large-diameter hole 9b has a greater inner diameter than the small-diameter hole 9a.

A seal member 10 is mounted onto the small-diameter hole 9a for establishing reliable sealing between the housing 2 and the reducer shaft 8. A second bearing 11 is fitted into the large-diameter hole 9b. Via the second bearing 11, the upper end of the reducer shaft 8 is rotatably supported on the housing 2. The second bearing 11 is a deep groove ball bearing, for example.

The lower surface 2a of the housing 2 has a recess 12 formed in a large part thereof at the center in the radial direction. The recess 12 receives therein the internal gear 3. A plurality of through holes 2b extend in the axial direction through the outer peripheral portion of the bottom surface 12a of the recess 12. The through holes 2b are used to secure the housing 2 to the base unit 102 together with the internal gear 3 and the first bearing 4 using bolt (not shown).

<Internal Gear>

The internal gear 3 is made of a rigid material and shaped annularly. The axis of the internal gear 3 is aligned with the axis of rotation C. The internal gear 3 has through holes 3f extending therethrough in the axial direction, which are aligned with the through holes 2b of the housing 2. Each of the through holes 3f is in communication with corresponding one of the through holes 2b in the housing 2. The internal gear 3 has internal teeth 3b formed on the entire inner peripheral surface. The internal teeth 3b mesh with external teeth 5a of the external gear 5, which will be described below. The first bearing 4 is fixed to the lower surface 3c of the internal gear 3 using bolts (not shown).

<First Bearing>

Figure 3:
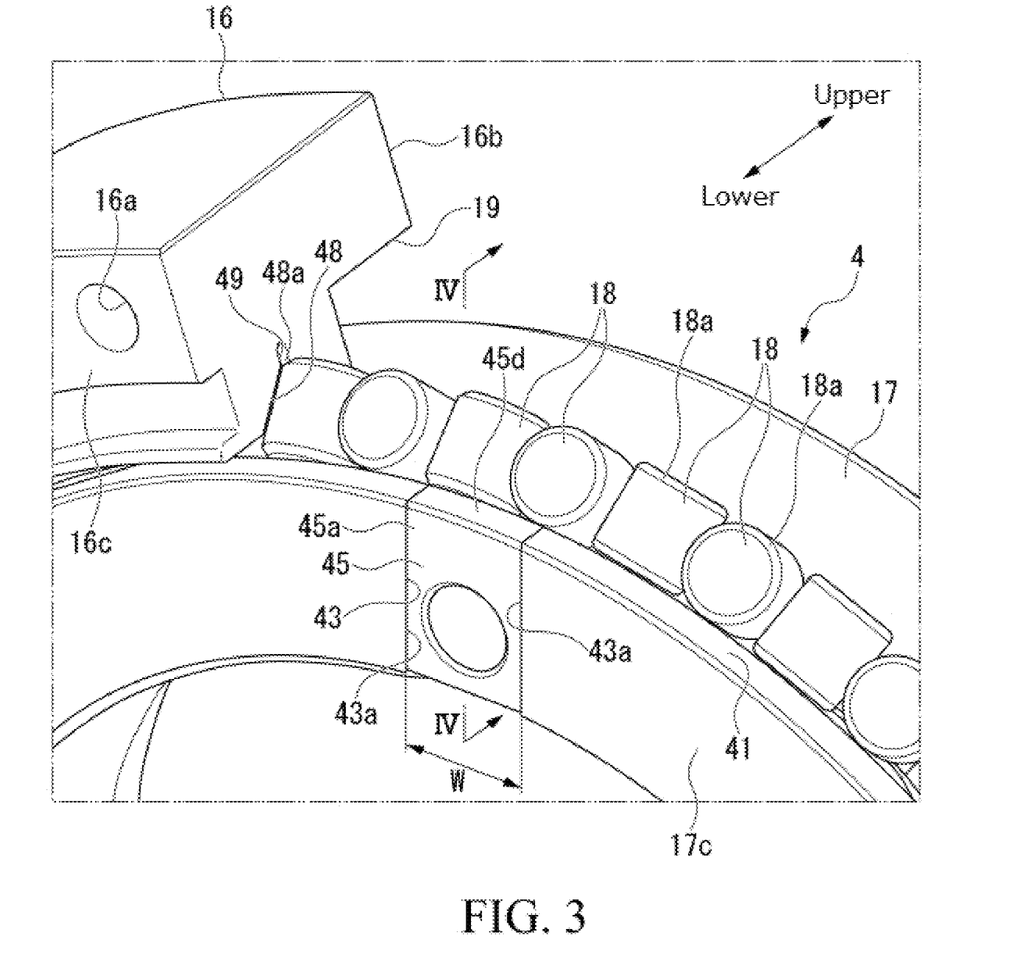
FIG. 3 is a perspective view of a first bearing relating to an embodiment of the present disclosure as viewed from below.
Figure 4:
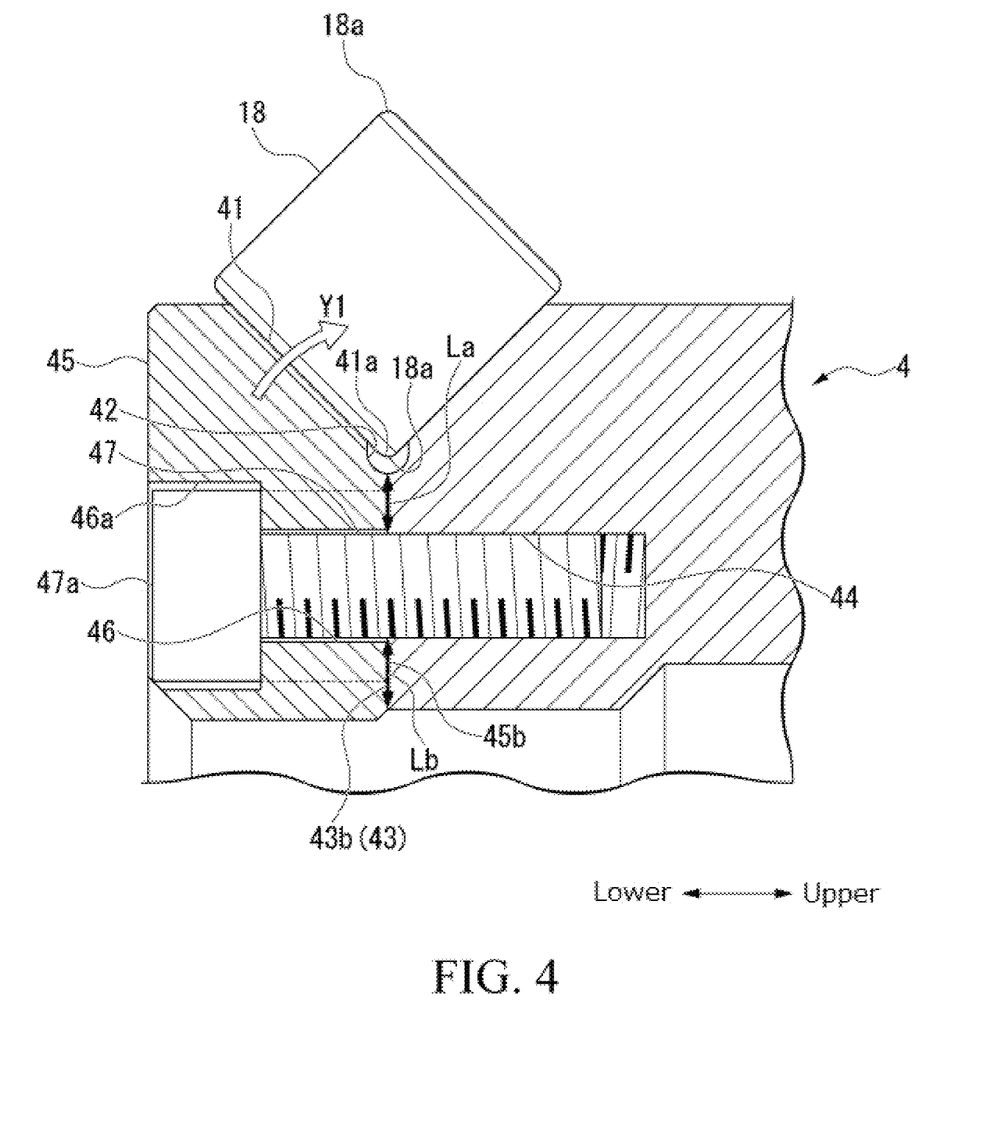
FIG. 4 is a sectional view along the line IV-IV in FIG. 3.

FIG. 3 is a perspective view of the first bearing 4 as viewed from below. In FIG. 3, the outer ring 16 is broken for better understanding. FIG. 4 is a sectional view along the line IV-IV in FIG. 3. As shown in FIGS. 2 to 4, the first bearing 4 is what is called a cross roller bearing. Specifically, the first bearing 4 includes an outer ring 16, an inner ring 17, and a plurality of cylindrical rollers 18 as rolling elements disposed between the outer and inner rings 16 and 17.

The upper surface 17a of the inner ring 17 has internally threaded portions 17b, which are aligned with the through holes 3f in the internal gear 3. Each of the internally threaded portions 17b is in communication with corresponding one of the through holes 3f in the internal gear 3. Although not shown, bolts are inserted through the through holes 2b in the housing 2 from above and through the through holes 3f in the internal gear 3 and tightened into the internally threaded portions 17b in the inner ring 17. In this manner, although not shown, the bolts can assemble the housing 2, internal gear 3, and inner ring 17 of the first bearing 4 into a single unit and secure them to the base unit 102.

The outer peripheral surface of the inner ring 17 has an inner raceway surface 41 formed therein for receiving the cylindrical rollers 18. The inner raceway surface 41 is shaped like a V-groove. The V-groove is a groove formed in the shape of V as viewed in the circumferential direction, in which the groove depth is gradually larger toward the center of the inner ring 17 (outer ring 16) in the axial direction. A relief groove 42 is formed at the apex 41a of the inner raceway surface 41, where the groove depth is the largest. An insertion groove 43 is formed in a portion of the lower surface 17c (an example of an axially-facing side surface set forth in the claims) of the inner ring 17. The insertion groove 43 is for inserting the cylindrical rollers 18 between the outer ring 16 and the inner ring 17.

As viewed from the circumferential direction, the insertion groove 43 extends from the lower surface 17c of the inner ring 17 to the apex 41a of the inner raceway surface 41. The insertion groove 43 has two flat inner side surfaces 43a formed on both sides thereof in the circumferential direction and has a flat bottom surface 43b located in a plane parallel to the radial direction passing through the apex 41a. The width W of the insertion groove 43 in the circumferential direction (the width W between the two inner side surfaces 43a) is slightly larger than the diameter of the cylindrical rollers 18. The bottom surface 43b has an internally threaded portion 44 formed therein on which a bolt 47 is tightened (described later).

A blocking plug (plug body) 45 is disposed in the insertion groove 43 to block the insertion groove 43. The blocking plug 45 is shaped rectangularly to correspond to the shape of the insertion groove 43. The size of the blocking plug 45 is slightly smaller than the size of the insertion groove 43. Specifically, the blocking plug 45 has outer side surfaces 45a that overlap the inner side surfaces 43a of the insertion groove 43 when the insertion groove 43 is blocked, and also has a mating surface 45b that overlaps the bottom surface 43b of the insertion groove 43. In addition, the blocking plug 45 has a blocking lower surface 45c that forms a part of the lower surface 17c of the inner ring 17, and also has a blocking raceway surface 45d that forms a part of the inner raceway surface 41. With the insertion groove 43 blocked by the blocking plug 45, the blocking lower surface 45c is flush with the lower surface 17c of the inner ring 17. With the insertion groove 43 blocked by the blocking plug 45, the blocking raceway surface 45d is flush with the inner raceway surface 41.

The blocking plug 45 has a bolt insertion hole 46 that is coaxial with the internally threaded portion 44 formed in the bottom surface 43b of the insertion groove 43. The bolt 47 is inserted into the bolt insertion hole 46, and the bolt 47 is tightened on the internally threaded portion 44, thereby securing the blocking plug 45 in the insertion groove 43. The bolt insertion hole 46 has a counterboring part 46a on the blocking lower surface 45c side. The counterboring part 46a receives the head 47a of the bolt 47. An example of the bolt 47 may be a hexagon socket bolt. Thus, the inner diameter of the counterboring part 46a of the blocking plug 45 is slightly larger than the outer diameter of the head 47a of the bolt 47.

In the mating surface 45b of the blocking plug 45, when the shortest length between the bolt insertion hole 46 and the inner raceway surface 41 is shown as La, and the shortest length between the bolt insertion hole 46 and the inner peripheral surface radially opposite to the inner raceway surface 41 is shown as Lb, the shortest lengths La and Lb satisfy the following formula.

$$La/Lb > 0.65 \tag{1}$$

Since a relief groove 42 is formed at the apex 41a of the inner raceway surface 41, the above shortest length La is the length excluding the relief groove 42.

When the head 47a of the bolt 47 is projected onto the mating surface 45b of the blocking plug 45 in the axial direction, the head 47a of the bolt 47 is within the mating surface 45b (see the dotted lines in FIG. 4). In other words, the radially outermost portion of the head 47a of the bolt 47 is not located radially outside the point corresponding to the above shortest length La as viewed in the axial direction. The radially innermost portion of the head 47a of the bolt 47 is not located radially inside the point corresponding to the above shortest length Lb as viewed in the axial direction.

Figure 5A:
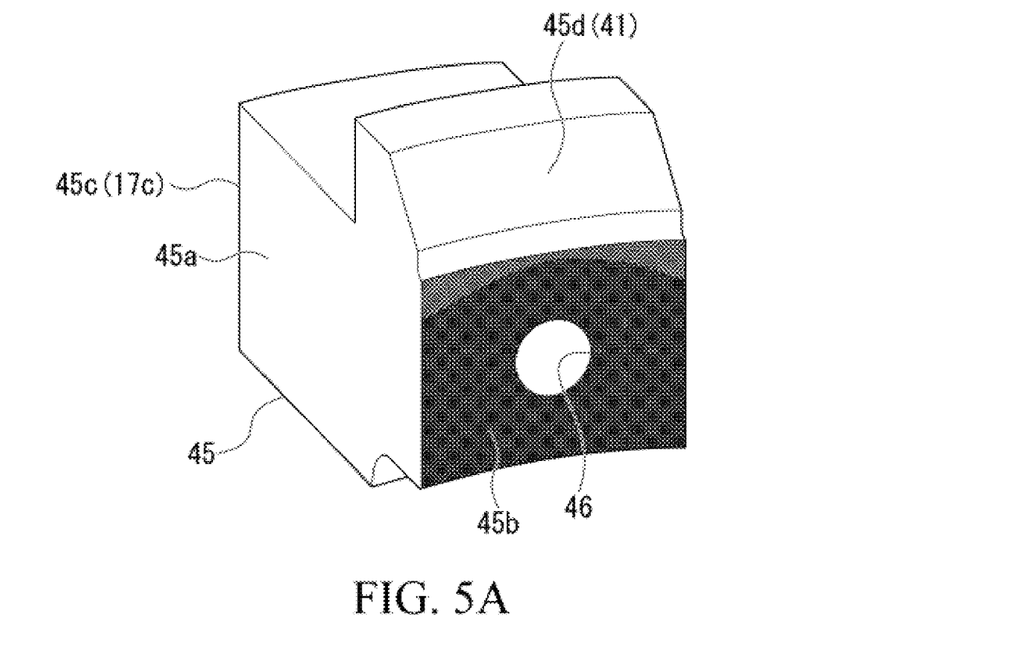
Figure 5B:
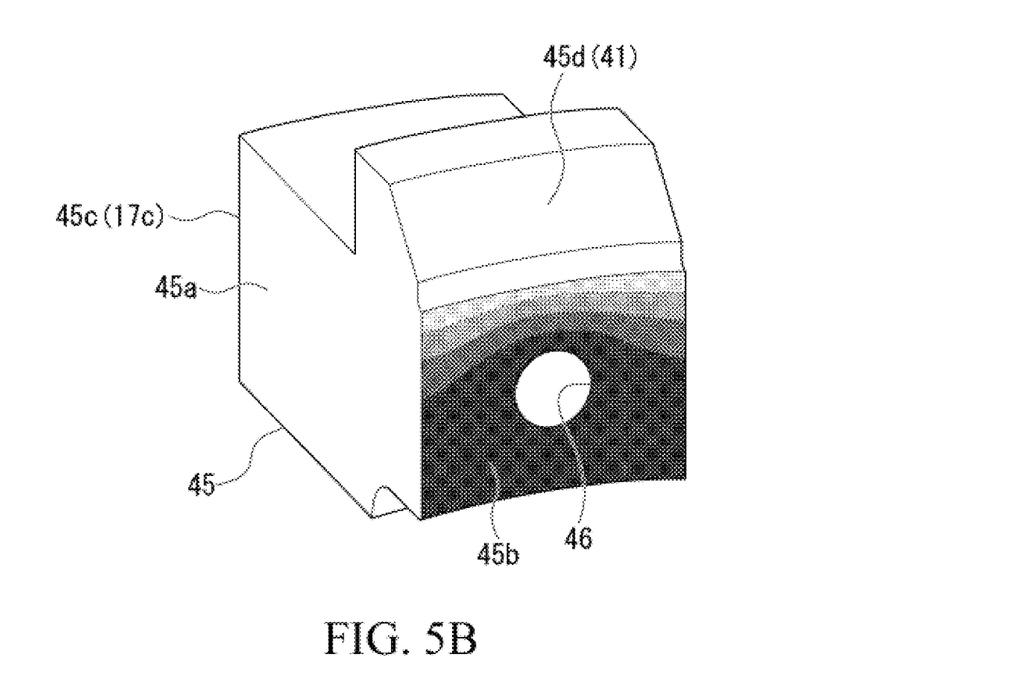

FIGS. 5A and 5B are views for comparing the degrees of tightness in contact between the mating surface 45b of the blocking plug 45 and the bottom surface 43b of the insertion groove 43 accomplished when the blocking plug 45 is secured in the insertion groove 43 using the bolt 47. The comparison is between the case where the above formula (1) is satisfied and the case where it is not satisfied FIG. 5A shows the case where the above formula (1) is satisfied. FIG. 5B shows the case where the above formula (1) is not satisfied. In FIGS. 5A and 5B, the degree of tightness is indicated by shading. Darkness indicates higher tightness.

FIGS. 5A and 5B show that when the above formula (1) is satisfied, the mating surface 45b of the blocking plug 45 as a whole is more tightly contacted with the bottom surface 43b of the insertion groove 43 than in the case where the above formula (1) is not satisfied. In particular, it can be observed that when the above formula (1) is not satisfied, a gap is produced in the region corresponding to the above shortest length La (see FIG. 5B).

Referring back to FIGS. 2 and 3, the outer ring 16 of the first bearing 4 has a plurality of through holes 16a extending through the outer peripheral portion in the axial direction. The through holes 16a are used to integrally secure the outer ring 16 of the first bearing 4, the external gear 5, and the output plate 7 via bolts, which are not shown. A seal housing depression 19 is formed in the upper surface 16b of the outer ring 16 in the inner peripheral portion. A seal member 20 is placed in the seal housing depression 19. The seal member 20 provides sealing between the outer ring 16 and the inner ring 17 in the upper portion of the first bearing 4. The seal member 20 can be any one of various seal members such as rubber oil seals.

The inner peripheral surface of the outer ring 16 has an outer raceway surface 48 formed therein for receiving the cylindrical rollers 18. The outer raceway surface 48 is shaped like a V-groove. A relief groove 49 is formed at the apex 48a of the outer raceway surface 48, where the groove depth is the largest.

The plurality of cylindrical rollers 18 placed between the outer ring 16 and the inner ring 17 are also placed between the outer raceway surface 48 and the inner raceway surface 41. The cylindrical rollers 18 are arranged between the outer raceway surface 48 and the inner raceway surface 41 so that their inclination angles alternate in the circumferential direction. Therefore, the outer circumferential edges 18a of the cylindrical rollers 18 are located at the apex 48a of the outer raceway surface 48 and the apex 41a of the inner raceway surface 41. The apex 48a and the apex 41a have the relief grooves 42 and 49, respectively. This prevents the outer circumferential edges 18a of the cylindrical rollers 18 from interfering with the raceway surfaces 48 and 41.

To assemble the first bearing 4 having such configuration, the blocking plug 45 of the inner ring 34 is first removed. The cylindrical rollers 18 are then inserted between the outer ring 16 and the inner ring 17 (between the outer raceway surface 48 and the inner raceway surface 41) through the insertion groove 43. After all the cylindrical rollers 18 are inserted, the insertion groove 43 is blocked by the blocking plug 45. The blocking plug 45 is secured in the insertion groove 43 by the bolt 47. Thus, the assembling of the first bearing 4 is completed.

When the head 47a of the bolt 47 is projected onto the mating surface 45b of the blocking plug 45 in the axial direction, the head 47a of the bolt 47 is within the mating surface 45b (see the dotted lines in FIG. 4). Therefore, the load of the blocking plug 45 pressed by the head 47a of the bolt 47 is securely received by the bottom surface 43b of the insertion groove 43. Suppose, for example, that the radially outermost portion of the head 47a of the bolt 47 is located radially outside the point corresponding to the above shortest length La as viewed in the axial direction. In such a case, a load is applied to the radially outer portion of the blocking plug 45 such that it falls onto the bottom surface 43b with the apex 41a serving as a fulcrum (see the arrow Y1 in FIG. 4). This reduces the tightness in contact of the mating surface 45b of the blocking plug 45 with the bottom surface 43b of the insertion groove 43. This is not the case in this embodiment, and the mating surface 45b of the blocking plug 45 as a whole is tightly contacted with the bottom surface 43b of the insertion groove 43.

<External Gear>

As shown in FIG. 2, the external gear 5 is made of an elastic material. For example, the external gear 5 is made from a thin metal plate. The external gear 5 has a cylindrical portion 21 and an external flange portion 22 (an example of the extended portion set forth in the claims). The cylindrical portion 21 and the internal gear 3 are concentric, and the external flange portion 22 extends from the lower end of the cylindrical portion 21 by being bent outward in the radial direction. The cylindrical portion 21 extends between the upper surface 3a of the internal gear 3 and the lower surface 16c of the outer ring 16 of the first bearing 4. The cylindrical portion 21 has external teeth 5a on the outer peripheral surface thereof, which are positioned to face the internal teeth 3b of the internal gear 3 in the radial direction. The external teeth 5a are meshed with the internal teeth 3b of the internal gear 3. The external teeth 5a are smaller in number than the internal teeth 3b. For example, the external teeth 5a are smaller in number by two than the internal teeth 3b.

The external flange portion 22 extends between the lower end of the cylindrical portion 21 and the outer peripheral surface of the outer ring 16 of the first bearing 4. When seen in the axial direction, the outer peripheral portion of the external flange portion 22 overlaps the lower surface 16c of the outer ring 16. The outer peripheral portion of the external flange portion 22 has a thick portion 22a that is thicker than the other portion. The thick portion 22a is positioned to overlap the outer ring 16 in the axial direction. The thick portion 22a has through holes 22b, which are aligned with the through holes 16a in the outer ring 16. Each of the through holes 22b is in communication with corresponding one of the through holes 16a in the outer ring 16.

<Output Plate>

The output plate 7 overlaps the thick portion 22a of the external flange portion 22 when seen in the axial direction. The output plate 7 is shaped like a circular plate. A pinion gear 107 is mounted on the lower surface 7a of the output plate 7 to transmit, for example, the power of the reducer-equipped motor 106 to the base unit 102.

The outer peripheral portion of the output plate 7 has a mating cylindrical portion 23 that projects toward the first bearing 4 and also has through holes 7b that are positioned radially inside the mating cylindrical portion 23 and aligned with the through holes 22b in the thick portion 22a. Each of the through holes 7b is in communication with corresponding one of the through holes 22b in the thick portion 22a. Thus, although not shown, bolts are inserted from above through the through holes 16a in the outer ring 16, the through holes 22b in the thick portion 22a, and then the through holes 7b in the output plate 7, to be tightened into internally threaded portions in the pinion gear 107, which are also not shown. In this manner, although not shown, the bolts can assemble the outer ring 16 of the first bearing 4, external gear 5, and output plate 7 into a single unit and secure them onto the pinion gear 107.

The output plate 7 has a shaft insertion hole 24 at the center in the radial direction. The shaft insertion hole 24 penetrates through the output plate 7 in the axial direction. The reducer shaft 8 is inserted through the shaft insertion hole 24. A seal member 26 is placed in the shaft insertion hole 24 in the output plate 7 to provide for sealing between the output plate 7 and the reducer shaft 8. The shaft insertion hole 24 in the output plate 7 mates with the outer peripheral surface of a third bearing 28. Via the third bearing 28, the lower end of the reducer shaft 8 is rotatably supported in the output plate 7. The third bearing 28 is a deep groove ball bearing, for example.

<Reducer Shaft>

The reducer shaft 8, which is rotatably supported at its opposite ends by the two bearings 11 and 28, is hollow. The reducer shaft 8 has a stepped outer peripheral surface.

<Wave Generator>

The wave generator 6 is located, in the radial direction, between the shaft body outer peripheral surface 8a of the reducer shaft 8 and the external teeth 5a of the external gear 5. The wave generator 6 has a cam 31 and a fourth bearing 32. The cam 31 is integrated with the shaft body outer peripheral surface 8a, and the fourth bearing 32 is arranged between the outer peripheral surface 31a of the cam 31 and the inner peripheral surface 21a of the cylindrical portion 21 of the external gear 5. The cam 31 projects outward in the radial direction from the shaft body outer peripheral surface 8a. The outer peripheral surface 31a of the cam 31 is shaped like an ellipse when seen in the axial direction. The fourth bearing 32 is a deep groove ball bearing, for example.

<How Strain Wave Gear Device Works>

The following now describes how the strain wave gear device 1 of the reducer-equipped motor 106 works. The strain wave gear devices of the other reducer-equipped motors 113a-113f in the robot body 103 work in the same manner as the strain wave gear device 1 of the reducer-equipped motor 106 provided on the base unit 102.

The outer peripheral surface 31a of the cam 31 of the wave generator 6 is shaped like an ellipse when seen in the axial direction. Via the fourth bearing 32, the external gear 5 is elastically deformed, so that the external teeth 5a partially mesh with the internal teeth 3b of the internal gear 3. While the partial meshing holds, the electric motor 110 is driven and the motor shaft 110a is resultantly rotated. Together with the motor shaft 110a, the reducer shaft 8 is rotated. Further, together with the reducer shaft 8, the cam 31 is rotated. In other words, the cam 31 of the wave generator 6 serves as an input part for receiving the rotational force produced and fed by the motor shaft 110a of the electric motor 110.

The difference in number of teeth between the external and internal teeth 5a and 3b causes their relative rotation around the axis of rotation C, while their meshing moves in the circumferential direction. In the present embodiment, the external teeth 5a are smaller in number than the internal teeth 3b. Therefore, the external gear 5 rotates at a lower rotational speed than the reducer shaft 8. The external gear 5 rotates while being elastically deformed.

The external flange portion 22 of the external gear 5 is integrated with the outer ring 16 of the first bearing 4 and the output plate 7, and thus the outer ring 16 of the first bearing 4 and the output plate 7 rotate at a speed obtained by reducing the rotation of the motor shaft 110a (reducer shaft 8), thereby outputting the reduced speed. In other words, the external gear 5 serves as an output part for reducing the speed of the rotation of the cam 31 serving as the input part and outputting the resulting rotation. The first bearing 4 supports the external flange portion 22 extending from the external gear 5 so as to be rotatable relative to the internal gear 3.

As the output plate 7 rotates, the pinion gear 107 resultantly rotates. This causes the base unit 102 to slide along the traveling rail 101 (see FIG. 1). In the first bearing 4, the rotation of the outer ring 16 relative to the inner ring 17 causes rolling of the cylindrical rollers 18. A load is then repeatedly applied to the blocking plug 45 of the inner ring 17 through the cylindrical rollers 18.

In the mating surface 45b of the blocking plug 45, the shortest length La between the bolt insertion hole 46 and the inner raceway surface 41 and the shortest length Lb between the bolt insertion hole 46 and the inner peripheral surface radially opposite to the inner raceway surface 41 satisfy the above formula (1). Therefore, the mating surface 45b of the blocking plug 45 as a whole is tightly contacted with the bottom surface 43b of the insertion groove 43 (see FIG. 5A). As a result, the rattling of the blocking plug 45 can be minimized even when a load is repeatedly applied to the blocking plug 45 by the cylindrical rollers 18. Loosening of the bolt 47 caused by the rattling of the blocking plug 45 can also be prevented.

The first bearing 4 is what is called a cross roller bearing. The cylindrical rollers 18 are arranged so that their inclination angles alternate in the circumferential direction. Therefore, in the inner raceway surface 41, depending on the orientation of the cylindrical rollers 18, there are locations where a greater load is applied to the lower raceway surface (inclined surface, the raceway surface on the blocking plug 45 side) and locations where a greater load is applied to the upper raceway surface (inclined surface, the raceway surface opposite the blocking plug 45). In addition to these loads, the load of the axial tension produced by the bolt 47 is taken into account to derive the above formula (1).

Therefore, in the first bearing 4 described above, the mating surface 45b of the blocking plug 45 can be contacted as tightly as possible with the bottom surface 43b of the insertion groove 43 formed in the inner ring 17. This minimizes the rattling of the blocking plug 45 in using the first bearing 4, and also minimizes the loosening of the bolt 47. In this manner, the first bearing 4 can continue stable operation.

In the first bearing 4, when the head 47a of the bolt 47 is projected onto the mating surface 45b of the blocking plug 45 in the axial direction, the head 47a of the bolt 47 is within the mating surface 45b (see the dotted lines in FIG. 4). Therefore, the load of the blocking plug 45 pressed by the head 47a of the bolt 47 can be securely received by the bottom surface 43b of the insertion groove 43. As a result, no part of the mating surface 45b of the blocking plug 45 is pressed off the bottom surface 43b of the insertion groove 43. This prevents the blocking plug 45 from tilting at an angle with respect to the insertion groove 43. Thus, the blocking plug 45 can be firmly secured in the insertion groove 43 by the bolt 47.

The insertion groove 43 has two flat inner side surfaces 43a formed on both sides thereof in the circumferential direction and has a flat bottom surface 43b located in a plane parallel to the radial direction passing through the apex 41a. The blocking plug 45 has outer side surfaces 45a that overlap the inner side surfaces 43a of the insertion groove 43 when the insertion groove 43 is blocked, and also has a mating surface 45b that overlaps the bottom surface 43b of the insertion groove 43. Therefore, surface contact can be ensured between the bottom surface 43b of the insertion groove 43 and the mating surface 45b of the blocking plug 45. Also, surface contact can be ensured between the inner side surfaces 43a of the insertion groove 43 and the outer side surfaces 45a of the blocking plug 45. Thus, the blocking plug 45 inserted into the insertion groove 43 can be held stably by these flat surfaces. Therefore, rattling of the blocking plug 45 can be reliably inhibited.

This configuration can be suitably used for the first bearing 4, what is called a cross roller bearing. The strain wave gear device 1 using the first bearing 4 can continue stable operation. The industrial robot 100 using the strain wave gear device 1 can continue stable operation.

The present disclosure is not limited to the above embodiment but encompasses various modifications of the above embodiment not departing from the purport of the present disclosure.

For example, in the above-described embodiment, the industrial robot 100 uses the reducer-equipped motors 106, 113a to 113f, each of which includes the strain wave gear device 1. The disclosure, however, is not limited to such, and the strain wave gear device 1 can be employed in driving units of various industrial robots other than the industrial robot 100. Such industrial robots include, for example, electric wheelchairs, traveling equipment, and various processing machines such as multitasking machines.

According to the above-described embodiment, the electric motor 110 is used as a power generating unit for generating a rotational force for the cam 31 serving as an input part. The disclosure, however, is not limited to such, and any power generating units can be used as long as they are capable of generating a rotational force for the cam 31. For example, the electric motor 110 can be replaced by a hydraulic motor, an engine or other power generating units.

In the above-described embodiment, the first bearing 4 is used in the strain wave gear device as a speed reducer. The disclosure, however, is not limited to such, and the first bearing 4 can be used as any bearing that rotatably support the output part of various speed reducers, such as trochoidal speed reducers, planetary gear speed reducers, eccentrically oscillating speed reducers and so on.

In the above embodiment, the inner ring 17 of the first bearing 4 has the insertion groove 43 formed in the lower surface 17c. The disclosure, however, is not limited to such, and the insertion groove 43 may be formed in the upper surface 17a of the inner ring 17. It is also possible that the insertion groove 43 is formed in the upper surface 16b or the lower surface 16c of the outer ring 16. When the insertion groove 43 is formed in the outer ring 16, the shortest length between the bolt insertion hole 46 of the blocking plug 45 and the outer raceway surface 48 is La, and the shortest length between the bolt insertion hole 46 and the outer peripheral surface radially opposite to the outer raceway surface 48 is Lb.

In the above embodiment, the insertion groove 43 has two flat inner side surfaces 43a formed on both sides thereof in the circumferential direction and has a flat bottom surface 43b located in a plane parallel to the radial direction passing through the apex 41a, and the blocking plug 45 has outer side surfaces 45a that overlap the inner side surfaces 43a of the insertion groove 43 when the insertion groove 43 is blocked, and also has a mating surface 45b that overlaps the bottom surface 43b of the insertion groove 43. However, the shapes of the insertion groove 43 and the blocking plug 45 are not limited to these. The insertion groove 43 may have any groove-like shape that allows the rolling elements to be inserted between the outer ring 16 and the inner ring 17. The blocking plug 45 may have any shape adapted to block the insertion groove 43 and including a part of the inner raceway surface 41 (outer raceway surface 48).

In the above-described embodiment, the first bearing 4 is what is called a cross roller bearing. The disclosure, however, is not limited to such, and any other rolling bearings may have the insertion groove 43 and the blocking plug 45 as does the first bearing 4.

In the above embodiment, the first bearing 4 supports the external flange portion 22 as an extended portion extending from the external gear 5 so as to be rotatable relative to the internal gear 3, and the external flange portion 22 extends between the lower end of the cylindrical portion 21 of the external gear 5 and the outer peripheral surface of the outer ring 16 of the first bearing 4. The disclosure, however, is not limited to such, and the extended portion may have any configuration that extends from the external gear 5. For example, the extended portion may have a cylindrical shape that extends in the axial direction directly from the lower end of the cylindrical portion 21. In the strain wave gear device 1, the first bearing 4 may have any configuration adapted to rotatably support the extended portion relative to the internal gear 3.

In the above embodiment, the bolt, which are not shown, are used to assemble the housing 2, internal gear 3, and inner ring 17 of the first bearing 4 into a single unit and secure them to the base unit 102. The present disclosure, however, is not limited to such, and the internal gear 3 and the inner ring 17 of the first bearing 4 can be secured in various manners. For example, the internal gear 3 and the inner ring 17 of the first bearing 4 may be secured to each other in advance. After the housing 2, internal gear 3, and inner ring 17 of the first bearing 4 are secured to each other in advance, they may be then secured onto the mating member (for example, the base unit 102 or the like).

In the embodiment disclosed herein, a member formed of multiple component may be integrated into a single component, or conversely, a member formed of a single component may be divided into multiple components. Irrespective of whether or not the constituent parts are integrated, they are acceptable as long as they are configured to solve the problems.

What is claimed is:

1. A bearing comprising:
   an inner ring having an inner raceway surface formed in an outer peripheral surface thereof;
   an outer ring having an outer raceway surface formed in an inner peripheral surface thereof;
   a plurality of rolling elements placed between the inner raceway surface and the outer raceway surface;
   an insertion groove formed in an axially-facing side surface of the inner ring for inserting the plurality of rolling elements between the inner raceway surface and the outer raceway surface;
   a blocking plug configured to block the insertion groove, the blocking plug having a part of the inner raceway surface formed thereon; and
   a bolt for securing the blocking plug in the insertion groove,
   wherein the blocking plug includes:
      a plug body having a bolt insertion hole formed therethrough in an axial direction, the bolt insertion hole being configured to receive the bolt; and
      a mating surface formed on the plug body and configured to overlap a bottom surface of the insertion groove, and
   wherein each of the inner raceway surface and the outer raceway surface has a V-shaped groove,
   wherein the plurality of rolling elements includes cylindrical rollers and is arranged so that inclination angles thereof alternate in a circumferential direction,
   wherein the inner raceway surface has an apex where a groove depth is the largest,
   wherein a relief groove is formed at the apex of the inner raceway surface,
   wherein in the mating surface, when a length provided by excluding the relief groove from a length between the bolt insertion hole and the inner raceway surface is shown as a shortest length La, and a length between the bolt insertion hole and a peripheral surface radially opposite to the inner raceway surface is shown as a shortest length Lb, the shortest lengths La and Lb satisfy a following formula: La/Lb>0.65,
   wherein, when a head of the bolt is projected onto the mating surface in the axial direction, the head of the bolt is within the mating surface, and
   wherein a radially outermost portion of the head of the bolt is not located radially outside a point of the mating surface corresponding to the shortest length La as viewed in the axial direction.

2. The bearing of claim 1, wherein the insertion groove includes a plurality of flat inner side surfaces,
   wherein the blocking plug includes a plurality of flat outer side surfaces that overlap the plurality of inner side surfaces, and
   wherein the plurality of inner side surfaces include the bottom surface, and the plurality of outer side surfaces include the mating surface.

3. A strain wave gear device comprising:
   an internal gear;
   an external gear positioned radially inside the internal gear;
   a wave generator being in contact with an inner peripheral surface of the external gear;
   an extended portion extending from the external gear; and
   a bearing rotatably supporting the extended portion relative to the internal gear,
   wherein the external gear has elasticity and rotates relative to the internal gear about an axis of rotation while partially meshing with the internal gear,
   wherein the wave generator causes the meshing between the internal and external gears to move in a circumferential direction extending around the axis of rotation,
   wherein the bearing is the bearing according to claim 1.

4. An industrial robot comprising:
   a power generating unit for generating a rotational force;
   a strain wave gear device including an input part and an output part, the input part being configured to receive the rotational force of the power generating unit, the output part being configured to change a speed of rotation of the input part and output the rotation at the changed speed; and
   a mating member mounted on the output part of the strain wave gear device,
   wherein the strain wave gear device is the strain wave gear device according to claim 3.

* * * * *